United States Patent [19]

Parks

[11] Patent Number: 5,795,934

[45] Date of Patent: Aug. 18, 1998

[54] METHOD FOR PREPARING A UREA-EXTENDED PHENOLIC RESOLE RESIN STABILIZED WITH AN ALKANOLAMINE

[75] Inventor: Claude Phillip Parks, Olympia, Wash.

[73] Assignee: Georgia-Pacific Resins, Jr., Atlanta, Ga.

[21] Appl. No.: 859,094

[22] Filed: May 20, 1997

[51] Int. Cl.$^6$ .................. C08G 63/48; C08G 63/91; C08G 12/34
[52] U.S. Cl. .................. 525/54.3; 525/480; 525/486; 525/534; 528/230; 528/239; 528/243; 528/256; 524/801
[58] Field of Search .................. 525/54.3, 480, 525/486, 534; 528/230, 239, 243, 256; 524/801

[56] References Cited

U.S. PATENT DOCUMENTS

| | | |
|---|---|---|
| 2,514,505 | 7/1950 | Morton . |
| 3,883,462 | 5/1975 | Pearson . |
| 4,297,264 | 10/1981 | De Ruiter et al. . |
| 4,339,361 | 7/1982 | MacPherson et al. .................. 527/303 |
| 4,961,795 | 10/1990 | Deflefsen et al. . |
| 5,025,077 | 6/1991 | Tetart et al. . |
| 5,264,535 | 11/1993 | Geoffrey et al. . |
| 5,300,562 | 4/1994 | Coventry et al. . |
| 5,362,842 | 11/1994 | Graves et al. . |
| 5,371,140 | 12/1994 | Parks . |
| 5,623,032 | 4/1997 | Wu . |

*Primary Examiner*—Nathan M. Nutter
*Attorney, Agent, or Firm*—Banner & Witcoff, Ltd.

[57] ABSTRACT

A water-soluble urea-extended phenol-formaldehyde resole resin stabilized with an alkanolamine alone or combined with a monosaccharide or disaccharide, methods of manufacturing the resin and using it, and products prepared using the resin.

19 Claims, No Drawings

METHOD FOR PREPARING A UREA-EXTENDED PHENOLIC RESOLE RESIN STABILIZED WITH AN ALKANOLAMINE

BACKGROUND OF THE INVENTION

1. Field of the Invention

This invention relates to a water-soluble urea-extended phenol-formaldehyde resole resin stabilized with an alkanolamine and a mono-saccharide or disaccharide, to methods of manufacturing the resin and using it, and to products prepared using the resin.

2. Description of Related Art

Typically, when a phenol-formaldehyde resole resin is used as a binder, e.g. for manufactured boards and fiber insulation products, the binder releases a significant amount of formaldehyde into the environment during cure. Formaldehyde also can be released subsequently from the cured resin, particularly when the cured resin is exposed to acidic environments. Such formaldehyde release is undesirable, particularly in enclosed spaces. Formaldehyde may be inhaled by workers and comes into contact with the eyes, the mouth, and other parts of the body. Formaldehyde is malodorous and is thought to contribute to human and animal illness. It is, therefore, desirable to reduce the release of formaldehyde into the environment.

Various techniques have been used to reduce formaldehyde emission from formaldehyde-based resins. In particular, various formaldehyde scavengers (i.e., chemicals usually added to the resin during or after its preparation) have been used in an attempt to reduce formaldehyde emission. Use of a formaldehyde scavenger often is undesirable, however, not only because of the additional cost, but also because it affects the characteristics, or properties, of the cured resin. A commonly used formaldehyde scavenger is ammonia. Unfortunately, when used in open plant processing areas, there is considerable worker exposure to vaporous ammonia, with a consequently unpleasant odor and irritation, as well as environmental control problems.

It is also well known that formaldehyde emissions can, in part, be controlled by the addition of free urea to the uncured resin system. Urea is often selected because it is inexpensive compared to other formaldehyde scavengers. Urea acts as a formaldehyde scavenger both at, and subsequent to, the manufacture of the product. Urea is typically added directly to the phenol-formaldehyde resin, to produce a urea-extended phenol-formaldehyde resole resin. The resin can be further treated or applied as a coating or binder, as desired, and then cured. These resins are typically used in, for example, the insulation industry as part of an adhesive for glass fibers. In this application, the urea addition also contributes to improved anti-punk characteristics for the cured binder.

To obtain a typical urea-extended resole binder resin, a mixture of phenol and formaldehyde is reacted, with a suitable alkaline catalyst, in one or more steps. The reaction conditions, temperature, catalyst amount, etc., are adjusted to favor phenol methylolation reactions over condensation reactions. Urea is then added after neutralizing the resin and most often just prior to use of the resin. Notwithstanding the desire to favor methylolation reactions, some condensation of methylolated phenolic monomers still occurs, producing undesirable dimer species. Such dimers can form an undesirable crystalline precipitate during resin storage, especially in solutions with a low formaldehyde content. This precipitation phenomenon is a particular problem in processes using formaldehyde scavengers. The most common organic compounds that precipitate in urea-extended resole resins are a two unit methylolated phenolic species (tetradimer) and a dimethylolated urea (DMU).

Because of this instability problem, urea-extended resoles must be prepared at the point-of-use, and even then a careful monitoring of inventory is needed to avoid processing problems caused by the undesired precipitation of these resin species.

U.S. Pat. No. 5,300,562 to Coventry purports to address this problem and suggests that urea-modified resole resins may be stabilized by the addition of ammonia. However, ammonia stabilized urea-extended resole resin systems do not have a sufficiently extended shelf live to allow commerce in a long term storage stable single package urea-extended resole resin. Thus a better stabilization technique is desired for urea-extended resole resins.

SUMMARY OF THE INVENTION

The present invention is directed to a method for stabilizing low molecular weight, water soluble, phenolic resole resin systems that have urea post-added to them, such as for reducing formaldehyde emissions or for improving cured resin anti-punk characteristics. Resole resins stabilized by the invention generally have 1–3 structural units of methylolated phenolic species and an average molecular weight of about 200 to 500. The resin is primarily composed of trimethylolated phenol (TMP).

In accordance with the present invention, an alkanolamines and a monosaccharide or disaccharide are added to the prepared resole resin composition following resin neutralization prior to or along with urea to stabilize the resin against the precipitation of dimers. The invention is directed not only to the method of stabilizing a urea-extended resole resin but also to the resulting stabilized resin made by the process.

In one embodiment, the present invention is directed to an improved method for preparing a urea-extended phenolic resole resin. Typically, a low molecular weight phenolic resole resin is prepared by reacting formaldehyde (F) and phenol (P) at an F:P mole ratio in the range of about 2:1 to 6:1 under aqueous alkaline reaction conditions and thereafter reacting residual free formaldehyde present in the low molecular weight phenolic resole resin with urea to form a urea-extended phenolic resole resin. The improvement provided by the present invention comprises adding an alkanolamine alone or preferably in combination with a monosaccharide or disaccharide to the low molecular weight phenolic resole resin, in an amount sufficient to improve the storage stability of the urea-extended phenolic resole resin, the alkanolamine and/or saccharide additives are added either prior to or contemporaneously with the urea addition to the low molecular weight phenolic resole resin.

The present invention is further directed to a storage stable urea-extended phenolic resole resin prepared by adding an alkanolamine alone or in combination with a monosaccharide or disaccharide to a low molecular weight phenolic resole resin either prior to or contemporaneously with urea addition to the low molecular weight phenolic resole resin. The alkanolamine alone or or in combination with the monosaccharide or disaccharide is added in an amount sufficient to improve the storage stability of the urea-extended phenolic resole resin.

DETAILED DESCRIPTION OF THE INVENTION

There are at least two factors used to assess the processing range and/or the stability of urea-extented phenol-formaldehyde resole resins and binder systems containing such resins:

1. The stability of the system with respect to precipitation of crystalline phenolic and methylolated urea species which is usually determined by precipitation and/or crystal growth rate.
2. The stability of the binder with respect to molecular weight advancement of the phenolic species which is usually determined by resin dilutibility with water.

The stabilized urea-extended phenol-formaldehyde resole resin prepared in accordance with the present invention, improves resin stability in both areas. The present invention relies on the addition to the fully prepared resole resin of an alkanolamine alone or preferably in combination with a monosaccharide or disaccharide compound as a stabilizing system. This combination is more effective in both retarding crystal growth and minimizing resin advancement than encountered with prior art stabilized urea-extended phenol-formaldehyde resole resin systems such as the ammonia stabilized of U.S. Pat. No. 5,300,562, which tends to have a shorter shelf life than conventional resins. In particular, we have found that the molecular weight of ammonia stabilized resin systems are undesirably advanced in one week whereas resin systems stabilized in accordance with the present invention are stable against excessive molecular weight adjustment for 3 to 4 weeks.

It was discovered that the addition of an alkanolamine alone provides a stable low molecular weight resole resin product. It was further discovered that the combination of an alkanolamine and a monosaccharide or disaccharide provides even a more stable product, even though monosaccharides or disaccharides are not effective stabilizers for urea-extended resole resins by themselves.

The present invention thus offers the ability to produce and ship a single package urea-extended phenolic resole resin that can be safely stored for up to 30 days. The single package format allows the consumer to purchase a complete ready-to-use resin which does not require a urea prereaction step prior to use. Alternatively, if a manufacturer is already using a urea prereaction step and would like to continue, for example to reduce costs, the present invention offers a phenolic resole resin which can be reacted with urea at the point of use and then safely stored for up to thirty days. Thus, it would not be necessary to use the resin promptly after the urea prereaction step as is currently necessary because of resin instability.

As used herein, phenol-formaldehyde resole resin includes reaction products of a phenol and formaldehyde having reactive methylol groups. Generally, phenol and formaldehyde are combined in the presence of an alkaline catalyst to form a resole resin. In accordance with the present invention, after essentially all of the phenol has reacted, the resin is stabilized by the addition of an alkanolamine alone or preferably in combination with a monosaccharide or disaccharide. The resin is then suitable for being extended with urea. The urea may be added to the stabilized resin in a prereaction step just prior to use of the resin as is conventional in the art. Alternatively, the urea may be added to the resin during its preparation after essentially all of the phenol has been consumed, contemporaneous with the addition of the stabilizers. This latter embodiment of the present invention provides a single package stabilized urea-extended phenol-formaldehyde resole resin system which does not require the urea prereaction step at the time of use.

The alkanolamine and monosaccharide or disaccharide are not an integral component of the resin synthesis process, but instead are post-added after essentially all of the phenol has reacted. As used herein, the phrase "essentially all" means at least about 90%, and more preferably 95 % or more. Otherwise, the alkanolamine and/or monosaccharide or disaccharide will react into the resin at the high temperatures and pH levels during preparation of the resin, and produces a resin having undesired properties such as lower water dilutibility.

The addition of the alkanolamine alone or together with a monosaccharide or disaccharide to the phenol-formaldehyde resole resin significantly increases the stability of the resin by preventing precipitation of phenolic dimer (tetradimer) and methylol ureas. There is also no resin advancement problem that is observed in, for example, ammonia stabilized systems. The addition of alkanolamines alone or with monosaccharides or disaccharides stabilizes a urea-extended phenol-formaldehyde resin and significantly increases its shelf life.

Low molecular weight phenolic resole resins suitably stabilized in accordance with the present invention can be prepared by reacting phenol and formaldehyde at a F:P mole ratio of about 2:1 to 6:1, preferably about 2.5:1 to 4.5:1, using an alkaline catalyst, at a temperature between about 50° and 80° C., preferably between about 55° and 65° C., under conditions to produce low molecular weight methylolated species. The mixture is allowed to react until essentially all of the phenol has reacted, preferably until a free phenol level of between about 0.05 and 5% is reached.

An alkanolamine alone or in combination with a monosaccharide or disaccharide is added to stabilize the resin, and urea is added as a formaldehyde scavenger and an antipunk agent, at a temperature between about 15° and 50° C., preferably between about 25° and 45° C. The mixture is then cooled to room temperature. Alternatively, the urea is not added at the time the alkanolamine and the monosaccharide or disaccharide are added, but instead is added at a later time, prior to use.

When adding the alkanolamine with or without the monosaccharide or disaccharide to the formed resole resin, the pH of the resin should be between about 6.5 and 11, preferably between about 7.5 and 9. If the resin pH is outside this range, then prior to the addition of the stabilizer(s), the resin should be cooled to between about 10° and 50° C. and a suitable neutralizing acid should be added. Then the alkanolamine with or without the mono-saccharide or disaccharide are added to the neutralized resin and the temperature adjusted by heating if necessary to between 15° and 50° C., and held at that temperature for a time sufficient to obtain an even dispersion throughout the resin, typically about 10 minutes to an hour.

The pH of the resin may be adjusted with an effective amount of any suitable neutralizing acid such as sulfamic acid, sulfuric acid, hydrochloric acid and the like. Sulfamic acid is preferred.

The alkanolamine and monosaccharide or disaccharide stabilizers are each added in amounts to be effective as a stabilizer and to maintain the water solubility of the final resin. Each stabilizer is generally added in amounts of 0.25 to 20 wt %, preferably 0.5 to 10 wt %, more preferably, 0.5 to 5 wt %, based on the weight of the resole resin prior to urea addition. The actual amount can be determined using routine experimentation and depends upon several variables including salt concentration, catalyst level, solids level, and mole ratio of formaldehyde to urea. The ratio of alkanolamine to a monosaccharide or disaccharide, if both are used, is preferably between about 1:2 and 2:1 in order to obtain the desired interactive effect between the two compounds.

The language "monosaccharide or disaccharide" is intended to encompass mixtures of monosaccharides, disaccharides, or both. Likewise, the term "alkanolamine" is intended to encompass mixtures of alkanolamines useful in the present invention.

In the broad practice of the present invention, it is not necessary to add the stabilizers during or immediately after manufacture of the resole resin. Thus, in a further embodiment, the stabilizers are added some time after the resin has been prepared and stored, but prior to addition of the urea.

The mole ratio of the urea to excess formaldehyde should be approximately 1:1, and generally is in the range of 0.8:1 to 1.2:1 as recognized by those skilled in the art. If the amount of urea added does not exceed a mole ratio of 0.5:1, a significant amount of dimethylol urea may be formed, contributing to a more unstable product.

A wide variety of alkanolamines are suitable as the alkanolamine stabilizer including triethanolamine, diethanolamine, tripropanolamine, and dipropanolamine. The preferred alkanolamine is diethanolamine. The monosaccharide or disaccharide provide a source of hydroxyl groups with a low volatility and is preferably sorbitol. Other monosaccharides or disaccharides useful in the present invention include sucrose, fructose, dextrin, corn syrup, starch hydrolyzates, and glycerin.

Other suitable methods for preparing low molecular weight phenol-formaldehyde resole resins for use with the present invention may be found in, inter alia, U.S. Pat. No. 5,079,332 which is hereby incorporated by reference in its entirety. There are a variety of techniques known in the art for reacting phenol and formaldehyde in the presence of an alkaline catalyst. Typically, the resin is reacted in stages with separate partial additions of either one or both of the reactants and alkaline catalyst. For example, one common procedure is to react phenol with a portion of the formaldehyde, in the presence of a portion of the alkaline catalyst.

After a brief, initial exothermic reaction, additional amounts of alkaline catalyst and formaldehyde are added to the reacting mixture and the reaction is continued with careful control of the reaction temperature. Once all of the reactants and catalyst have been added, the reaction is allowed to proceed to a suitable endpoint, which may be determined by measuring the refractive index of the reacting mixture or by measuring the viscosity of the reacting mixture or by some combination thereof as recognized by those skilled in the art.

The catalyst is present in an amount effective to catalyze the reaction between the phenol and formaldehyde usually in amounts to provide a catalyst to phenol mole ratio of about 0.04 to 1.5. Preferably, part of the catalyst is added at the beginning of the resin cook, and the rest is added during the cook. Alternatively, the phenol and catalyst are combined initially and then formaldehyde is added in a stepwise manner. The pH during the phenolformaldehyde reaction is preferably adapted to a value between about 9 and 12, and more preferably between about 10.5 and 11.5 using the alkaline catalyst.

Skilled practitioners recognize that the reactants are commercially available in many forms. Any form which can react with the other reactants and which does not introduce extraneous moieties deleterious to the desired reaction and reaction product can also be used in the preparation of the melamine-urea-formaldehyde resin of the invention.

Urea is available in many forms such as solid urea, for example prill, and urea solutions, typically aqueous solutions. Any form of urea is suitable for use in the practice of the invention.

Formaldehyde is also available in many forms. Paraform (a solid, polymerized formaldehyde) and formalin solutions (aqueous solutions of formaldehyde, sometimes with methanol, in 37%, 44%, or 50% formaldehyde concentrations) are commonly used forms. Formaldehyde also is available as a gas. Any of these forms is suitable for use in the practice of the invention. Further, the formaldehyde may be partially or totally replaced with any suitable aldehyde as known in the art. Typically, formalin solutions low in methanol are preferred as the formaldehyde source.

The phenol component of the resole resin includes any phenol typically used in preparing phenolic resole resins, which are not substituted at either the two ortho positions or at one ortho and the para position, such unsubstituted positions being necessary for the desired polymerization reaction to occur. Phenols substituted in these positions may be used in lesser quantities (e.g., up to about 30 weight % of the phenol component) as it is known in the art to control molecular weight by a chain termination reaction. Any one, all, or none of the remaining carbon atoms of the phenol ring can be substituted in a conventional fashion. The nature of these substituents can vary widely, and it is only necessary that the substituent not interfere in the polymerization of the aldehyde with the phenol at the ortho and/or para positions thereof. Furthermore, at least a portion of the phenol component must include a phenol not blocked at the ortho and para positions so that the resin is thermosettable. Preferably, at least 10% by weight of the phenol component should include such tri-functional phenol and usually the phenol component consists essentially entirely of such tri-functional phenol.

Substituted phenols which optionally can be employed in the formation of the phenolic resins include alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and usually from 1 to 9, carbon atoms.

Specific examples of suitable phenols for preparing the resole resin composition of the present invention include: hydroxy benzene (phenol), o-cresol, m-cresol, p-cresol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, naphthol, anthranol and substituted derivatives thereof. Ordinary phenol (hydroxy benzene) normally is preferred for most applications based on cost and availability.

The catalyst promotes the reaction of the formaldehyde with phenol to form a resole resin, and is usually one of the inorganic or organic alkaline catalysts known to be useful in preparing phenol-formaldehyde resole resins. Typical catalysts include alkali metal hydroxides, such as sodium hydroxide, lithium hydroxide, potassium hydroxide, or mixtures thereof, generally sodium hydroxide is preferred for cost and availability. Other catalysts include alkali metal carbonates such as sodium carbonate and potassium carbonate, alkaline earth hydroxides such as magnesium hydroxide, calcium hydroxide and barium hydroxide, and amines.

During the process of preparing the resole resins of the present invention, a variety of other modifiers can be added into the resole resin in order to improve toughness and other cured resin properties. These modifiers include, for example, chain terminating phenols, glycols, with or without halogen substitution for additional fire retardancy, polyester polyols, alkyl phenols, hydroxy-containing acrylates, latexes, polyvinyl acetates, and the like and mixtures thereof. The proportion of such modifiers incorporated into the resole resin typically ranges from 5 to 35 weight percent (based on the phenol component.)

Other modifiers such as fire retardants, lubricants, defoamers, plasticizers, softening agents, pigments and fillers also can be added to the resole resin composition. Reactive modifiers such as di- and higher polyols, e.g., di- or polyhydric phenols, resorcinol, phloroglucinol, and the like, can be added to the resole resin after it has been formulated. Finally, modifiers to achieve special effects in particular applications may be appropriate, e.g., polyvinyl butyrals, or epoxies for better impact strength in composites.

The process steps of making the resin is similar to most resole resins. First the raw materials for the initial resole are loaded, catalyst is added, and the methylolation of the phenolic is performed. After the resole is reacted to the cutoff, it is adjusted to the desired pH with acid. The resin is then fortified with the stabilizers. The urea may or may not be added with the stabilizers. If the urea is added,the unditioning hold of one hour is used to establish the urea formaldehyde equilibrium. This product has a 100% yield (assuming no distillation on the resole precursor). After addition of the stabilizers and urea and performing the conditioning hold, the resin is complete.

There are many products which can utilize the resins of the present invention including insulation resin binders, plywood resin binders etc. A preferred use of the present invention is for preparing a resin used in making a binder for glass mineral fibers, home insulation, and air ducts fabrication.

The present invention provides an amber clear resinous liquid that dilutes in water at least 50:1 weight of water to weight of resin. In addition it also includes the emulsifiable systems which when diluted self emulsify and become a low internal phase emulsion and have an opaque appearance. The resin has a free phenol content of 0.05% to 5% by weight, and a free formaldehyde content of between 0.1 to 2.0% by weight. The storage life of the resin is at least 30 days at 5° C.

The non volatile solids is typically 40 to 55 % by weight and the viscosity is about 100 cps at 50% solids The stability of the resin is best maintained if stored at a temperature below about 15° C., preferably between 5° C. and 15° C. At higher temperatures the resole will be more stable to precipitation; however, it will be more susceptible to advancement of the methylolated phenolics species. The pH of the resole resin during storage is preferably between that of the unneutralized resin and approximately 6.5. Preferably the pH of the resin is between about 8.5 to 7.0. Above 8.5 and below 6.5 reactions of the methylol ureas and methylolated phenolics will increase. The increase in reactivity usually results in a decrease in stability. In addition, the molecular weight of the resin advances more quickly at higher pH.

The salt concentration of the precursor resole should not be in excess of that quantity of salt formed upon neutralization of the catalyst used for methylolation. Excessive salt will decrease the stability of the resin.

The following examples are for purposes of illustration and are not intended to limit the scope of the claimed invention.

EXAMPLES

Example 1

A Box Behnken study was conducted which demonstrated that alkanolamines and monosaccharides or disaccharides increase the stability of resins extended with urea. This study examined:

1. Addition of Triethanolamine (TEA - an alkanolamine), at 0, 5 and 10 wt % levels based on total weight of liquid resin, of addition based on a mole/mole of additive to excess formaldehyde in the resin.
2. Addition of sorbitol, (a monosaccharide), at 0, 5 and 10 wt % levels based on total weight of liquid resin, of addition.
3. Addition of urea, (a formaldehyde scavenger), at free formaldehyde/urea mole ratios of 0.8, 1.0, and 1.2. Where the moles free formaldehyde is the excess formaldehyde in the resin after methylolation.

Thirteen resins were formulated and stored at two temperatures in two types of containers. Each resin was formulated from a 3.65 F:P mole ratio resole resin having a pH adjusted to 8.5. The resin was modified as described above. Each resin had approximately 50% solids. The storage temperatures were 15° C. and 5° C. and the containers were glass and glass/metal. All storage samples were seeded with several small tetradimer crystals to promote crystal growth.

Measurement of the amount of precipitation formed was made using a five point grading system. The storage samples were inspected routinely and assigned a value depending on the amount of crystal growth in the storage container.

Observations made in the study were:

1. The mole ratio of free formaldehyde to urea was not significant.
2. Samples with addition of triethanolamine were more stable than samples without.
3. Addition of sorbitol was not significant when added to the resin alone; however, there was a significant increase in stability when comparing addition of sorbitol with triethanolamine to samples with triethanolamine only.
4. The triethanolamine and triethanolamine/sorbitol stabilized resins were more stable than the ammonia system in regard to molecular weight advancement (determined by water dilutibility).
5. Storage temperature was significant. The 5° C. samples were less stable to precipitation than the 15° C. samples.

Example 2

A commercial resole resin, typically used for insulation, having a 3.95 F:P mole ratio and a pH adjusted to 8.0 was obtained. The stability of three versions of the resin were compared.

1. The resin prereacted with urea, no addition of stabilizers (control).
2. The resin with addition of 5% triethanolamine (85% concentration) and 2% sorbitol (65% concentration). Additions were made by weight of liquid resin. The resin was prereacted with urea after the addition of the stabilizers.
3. The resin with addition of 5% diethanolamine (100% concentration) and 2% sorbitol (65% concentration). Additions were made by weight of liquid resin. The resin was prereacted with urea after the addition of the stabilizers.

Samples were stored at 15° C. and 25° C. The 15° C. samples were seeded with tetradimer crystals. Observations from the study were:

1. The control resin urea premix precipitated in 36 hours (both the 25° C. and 15° C. samples).
2. Both of the modified samples stored at 15° C. and 25° C. were stable, with no precipitation, at 22 days age.
3. Diethanolamine (DEA) also works a stabilizer.

Example 3

The type of alkanolamine, level of addition, and storage temperature were compared. In addition, two other samples were prepared and observed. They were an ammonia stabilized system and a TEA, DEA, sorbitol sample. In this experiment the addition amounts were based on mole equivalents. A 3.65 mole ratio phenolic resin neutralized to pH 8.5 was used as the starting block in the experiment. Samples were stored at 15° and 25° C. The 15° C. samples were seeded with tetradimer crystals. The levels of additives in this study were approximately 33% and 15% used in the first study. Observations were:

1. All of the 15° C. modified samples were more stable that the unmodified sample.

At four days an increase was observed above the amount of original seed crystals in the control (20–50% increase). No increase was observed in the modified samples.

At seven days the control had formed a massive hard precipitate covering the entire bottom of the of the storage container (in excess of ten times the seed crystals). Two of the six stabilized samples showed an increase above the seed crystal level (20–50% increase). The samples showing an increase were the TEA/sorbitol samples. The other modified samples did not show any increase.

At ten days the control still had a massive precipitation. Four of the six stabilized samples now showed a slight increase above the amount of seed crystals (20–50% increase). The two DEA/sorbitol samples were unchanged (no precipitation increase above the seed level). Water dilutibilities were run on the 15° C. samples. All samples had a 50:1 water dilute, except the ammonia modified system, it was only 9:1.

At fourteen days the control still had a massive precipitation. No further changes were observed in the crystal growth of the modified samples.

2. The ammonia stabilized system lost water dilutibility faster than any of the other resins.

The ammonia system had a water dilute of 9:1 while all others had a greater than 50:1 water dilute.

Example 4

3.65 moles of formaldehyde, as a 50% solution, was added to 1 mole of phenol and brought to 55° C. Next the methylolation of the resin was catalyzed by addition of 0.148 moles of NaOH. The mixture was allowed to react until substantially all of the phenol had reacted (% free phenol 0.3%). When the mixture reached a 0.3% free phenol the resin was cooled to 30° C. and was adjusted to pH 8.5 with sulfamic acid. After pH adjustment 10.0 grams of triethanolamine, 12.0 grams of sorbitol and 24 grams of urea were added. The mixture was heated to 40° C. held for one hour and then cooled and stored. This resin was then complete and ready for use in binder formulation.

Example 5

3.65 moles of formaldehyde, as a 50% solution, was added to 1 mole of phenol and brought to 55° C. Next the methylolation of the resin was catalyzed by addition of 0.148 moles of NaOH. The mixture was allowed to react until substantially all of the phenol had reacted (% free phenol 0.3%). When the mixture reached a 0.3% free phenol the resin was cooled to 40° C. and was adjusted to pH 8.5 with sulfamic acid. After pH adjustment 10.0 grams of triethanolamine and 12.0 grams of sorbitol were added. The mixture was held at 40° C. for one hour and then cooled and stored. This resin is complete and ready for prereaction with urea.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

I claim:

1. In a method for preparing a urea-extended phenolic resole resin, comprising preparing a phenolic resole resin by reacting formaldehyde (F) and phenol (P) at an F:P mole ratio in the range of about 2:1 to 6:1 under aqueous alkaline reaction conditions and reacting free formaldehyde in the phenolic resole resin with urea to form a urea-extended phenolic resole resin, the improvement comprising adding an alkanolamine to the phenolic resole resin, in an amount sufficient to improve the storage stability of the urea-extended phenolic resole resin, either prior to or contemporaneously with the urea reaction with the phenolic resole resin.

2. The method of claim 1, further comprising cooling the resin to between about 10° and 50° C. and adjusting the resole resin to a pH between about 6.5 and 11 prior to adding the alkanolamine, adding the alkanolamine, and then heating the resin to between about 15° C. and 50° C.

3. The method of claim 1 wherein the urea is added contemporaneously with the alkanolamine.

4. The method of claim 1 wherein the urea is added after the addition of the alkanolamine.

5. The method of claim 1 wherein the alkanolamine is selected from the group consisting of triethanolamine, diethanolamine, tripropanolamine, and dipropanolamine.

6. The method of claim 5 wherein the alkanolamine is diethanolamine.

7. The method of claim 2 wherein the pH is adjusted to between about 7.5 and 9.

8. The method of claim 1 wherein a monosaccharide or disaccharide is added along with the alkanolamine in an amount effective to improve storage stability of the urea-extended phenolic resole resin.

9. The method of claim 8, further comprising cooling the resin to between about 10° and 50° C. and adjusting the resole resin to a pH between about 6.5 and 11 prior to adding the alkanolamine and the monosaccharide or disaccharide, adding the alkanolamine and the mono- or disaccharide, and then heating the stabilized resin to between about 15° C. and 50° C.

10. The method of claim 8 wherein the urea is added contemporaneously with the alkanolamine and the monosaccharide or disaccharide.

11. The method of claim 8 wherein the urea is added after the addition of the allanolamine and the monosaccharide or disaccharide.

12. The method of claim 8 wherein the monosaccharide or disaccharide is selected from the group consisting of sorbitol, sucrose, and fructose.

13. The method of claim 12 wherein the monosaccharide is sorbitol.

14. The method of claim 8 wherein the alkanolamine is selected from the group consisting of triethanolamine, diethanolamine, tripropanolamine, and dipropanolamine.

15. The method of claim 14 wherein the alkanolamine is diethanolamine.

16. The method of claim 9 wherein the pH is adjusted to between about 7.5 and 9.

17. The method of claim 8 wherein the alkanolamine and the monosaccharide or disaccharide are each added in amounts between 0.25 to 20 wt % based on the phenolic resole resin prior to addition of urea, and the ratio of the alkanolamine to the monosaccharide or disaccharide is between about 1:2 and 2:1.

18. A storage stable urea-extended phenlic resole resin prepared by adding an alkanolamine to the phenolic resole resin either prior to or contemporaneously with urea addition to the phenolic resole resin, wherein the alkanolamine is added in an amount sufficient to improve the storage stability of the urea-extended phenolic resole resin.

19. A storage stable urea-extended phenolic resole resin prepared by adding 1) an alkanolamine and 2) a monosaccharide disaccharide to a phenolic resole resin either prior to or contemporaneously with urea addition to the phenolic resole resin, wherein the alkanolamine and the monosaccharide or disaccharide are added in an amount sufficient to improve the storage stability of the urea-extended phenolic resole resin.

* * * * *

UNITED STATES PATENT AND TRADEMARK OFFICE
CERTIFICATE OF CORRECTION

PATENT NO.: 5,795,934

DATED: August 18, 1998

INVENTOR(S): Claude Phillip Parks

It is certified that an error appears in the above-identified patent and that said Letters Patent is hereby corrected as shown below:

On Cover Page, Assignee, delete "Jr." and insert --Inc.--.

In The Specification:
   Column 2, line 58, delete "or" (first occurrence).
   Column 7, line 20, delete "the" (third occurrence) and insert --a--;
         line 21, delete "unditioning" and insert --conditioning--.
   Column 9, line 19, delete "of the" (first occurrence).

In The Claims:
   Column 11, line 5, claim 18, delete "phenlic" and insert --phenolic--.

Signed and Sealed this

First Day of December, 1998

Attest:

BRUCE LEHMAN

Attesting Officer      Commissioner of Patents and Trademarks